J. Seitz, Sr.,
Hay Press.
Nº 31,630.    Patented Mar. 5, 1861.
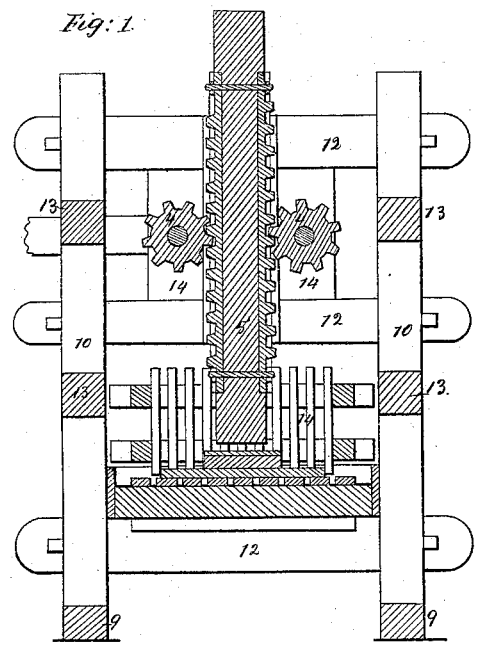
Fig: 1
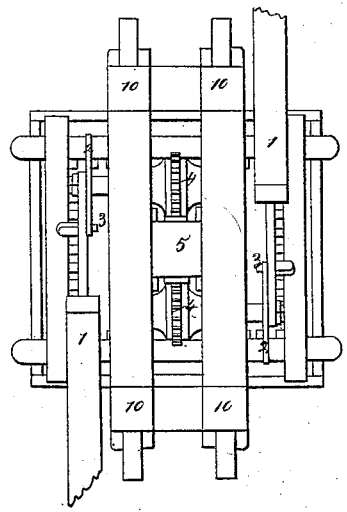
Fig: 2
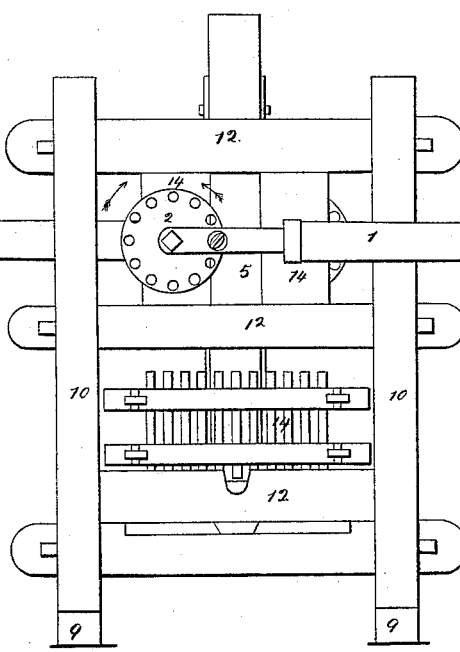
Fig: 3
Witnesses;
John Cermenly
Mary D. White
Inventor;
John Seitz Sr
By Thos P Heow

UNITED STATES PATENT OFFICE.

JOHN SEITZ, SR., OF BLOOM, OHIO.

PRESS.

Specification of Letters Patent No. 31,630, dated March 5, 1861.

*To all whom it may concern:*

Be it known that I, JOHN SEITZ, Sr., of Bloom, in the county of Seneca and State of Ohio, have invented certain Improvements in Presses, the construction and operation of which I have described in the following specification and illustrated in its accompanying drawings with sufficient clearness to enable competent and skilful workmen in the arts to which it pertains or is most nearly allied to make and use my invention.

My said invention consists in:—The combination with two loaded, adjustable levers upon opposite sides of the machine, of two perforated disks and pinions fixed upon the axes or fulcrums of the levers, the levers being capable of adjustment in various positions, with respect to the disks, and also of attachment to the latter when brought into the desired position, and which said levers, when so attached, cause, by means of weights hung to their extremities, the disks to rotate, thereby rotating the pinions, the teeth of which working into racks attached to the follower, causes it to descend vertically, as more fully described hereafter.

In the accompanying drawings: Figure 1 is a vertical section through the center of the machine, and parallel to its length. Fig. 2 is a plan. Fig. 3 is a side elevation.

The levers 1, 1, work upon the same center of motion as the circular disk 2, 2, and may be attached to these disks in any radial position by passing the pins 3, 3, through a perforation in the metallic portion of the lever, and also through one of the perforations in the corresponding disk, in the manner shown upon the drawings. Upon the same axis as each disk and lever, but inside of the frame work of the machine, pinions 4, 4, are attached, one on each side of the ram 5. The teeth of the pinions work into the teeth of racks, which are attached, one to each side of the ram, as shown upon the drawings. A little consideration will make it evident that by pressing upon the outer extremities of the levers 1, 1, the disks 2, 2, and the attached pinions 4, 4, are made to rotate in such a direction as to depress the ram 5; and it is equally evident, that by raising the levers, the ram is also raised. The consequence also, of the pinions being placed on opposite sides of the follower is, that its upward and downward motion is rendered much easier and steady, and its tendency to bind in the ways is prevented, a tendency which can scarcely be obviated, when the moving force is applied to one side only. Each lever is composed of two pieces: a metallic blade in which the center of motion is situated, and a wooden handle, in which is a socket for receiving the movable end of the blade. To the outer extremity of the wooden handle of each lever, hooks 6, 6, are attached in the manner shown upon the drawing, and upon these hooks, the open boxes 7, 7, are hung by means of the rings 8, 8, attached to the upper rails of these boxes. These boxes are filled with ponderable materials of any kind, which is easily procurable, say for instance, common stones, the object being to force down the ends of the lever, and thereby communicate a vertical downward motion to the follower, for the purpose of crushing or pressing upon (as the case may be) any substance which may have been placed underneath the ram for that purpose.

I have not entered into any description of the frame work which supports the different parts of the machine, consisting of the sills 9, 9, the stiles 10, 10, the rails 12, 12, the short rails 13, and the muntins 14, because I believed that a simple inspection of the drawings, would render these matters sufficiently intelligible to any ordinary carpenter; and for a similar reason, I have said nothing respecting the method of attaching the levers, disks, and pinions together.

The inclosure or open box 14, represents the usual receptacle for containing the apples to be crushed in making cider, but as this does not form any part of the invention, I need not further allude to it.

The mode of operation is as follows: The substance to be crushed or pressed having been placed under the ram, the levers 1, 1, are brought to the proper degree of elevation, say about 45 degrees above the horizontal line, and being fixed in that position, by attaching them to the disks 2, 2, by means of the pins 3, 3, the open boxes 7, 7, filled with stone or other ponderous material are hung on the hooks 6, and the machine may then be left to itself to finish the work. The weight of the loaded boxes will force down the ends of the levers, and from the connection which exists between the different parts of the machine, and which has been already explained, the follower must also descend, and either crush the article beneath, or exert a continual pressure upon it, as before explained, and without the necessity of the exertion of any muscular force on the part of the operator to produce or maintain it.

Having thus fully described my invention, what I claim, and desire to have secured to me by Letters Patent is:—

The combination with the two loaded adjustable levers 1, 1, of the perforated disks 2, 2, upon the same axis of motion as the levers, the said disks and levers being so combined and attached, as to render the levers capable of adjustment, as before described, and the disks and levers being upon the same axis of motion as the pinions which drive the follower, as hereinbefore more particularly described.

JOHN SEITZ, Sr.

Witnesses:
PETER I. SEINER,
ISAAC SEITZ.